United States Patent Office 3,085,110
Patented Apr. 9, 1963

3,085,110
RESOLUTION OF N-d- AND N-l-SEC-BUTYLCYCLO-HEXYLAMINE BY METHYL HYDROGEN DIBENZOYL-D TARTRATE
Vernon V. Young, Terre Haute, Ind., assignor to Commercial Solvents Corporation, New York, N.Y., a corporation of Maryland
No Drawing. Filed May 25, 1959, Ser. No. 815,331
6 Claims. (Cl. 260—563)

My invention relates to the production of dextrorotatory (d) and livorotatory (l) N-sec-butylcyclohexylamines. More particularly, it relates to the resolution of N-d- and N-l-sec-butylcyclohexylamines from a racemic mixture of N-dl-sec-butylcyclohexylamine.

During the past 25 years, many new analgetic compounds have become known to the medical art. Among these analgetics is N-sec-butylcyclohexylamine. The analgetic N-sec-butylcyclohexylamine as prepared by the condensation of sec-butylamine with cyclohexanone is an optically inactive (dl)-racemic mixture. It has long been known that the greater part of the physiological activity of racemic mixtures is generally due to only one of the racemic forms. In many examples, also, it has been found that the form which is less active from a physiological point of view is the more toxic form. The removal of the relatively physiologically inactive form from the racemic mixture, therefore, gives a product of greater utility than the racemic mixture.

I have now discovered a process whereby substantially pure N-d-sec-butylcyclohexylamine and substantially pure N-l-sec-butylcyclohexylamine can be resolved from the racemic mixture of N-dl-sec-butylcyclohexylamine.

My new process for the resolution of N-d- and N-l-sec-butylcyclohexylamines from their racemic mixture involves essentially forming the water-insoluble salts with methyl hydrogen dibenzoyl-D-tartrate, namely, N-d-sec-butylcyclohexylammonium methyl dibenzoyl-D-tartrate hereinafter called the d-D salt, and N-l-sec-butylcyclohexylammonium methyl dibenzoyl-D-tartrate hereinafter called the l-D-salt, and separating the d-D salt from the l-D salt, converting the separated water-insoluble salts into water-soluble salts of N-d-sec-butylcyclohexylamine and N-l-sec-butylcyclohexylamine, forming aqueous solutions of the said water-soluble salts, converting the respective water-soluble salts of the amines to the respective free amine forms and recovering the N-d- and N-l-sec-butylcyclohexylamines as free amines. Methyl hydrogen dibenzoyl-D-tartrate and the preparation thereof was discussed by F. Zetzsche and Mr. Hubacher in Helvetica Chimica Acta, volume 9, (1926), at page 259.

In carrying out my invention, I can prepare the water-insoluble d-D and l-D salts by any suitable means. I prefer, however, to form the above-mentioned salts in a solvent. Any solvent which is substantially inert to the dl racemic mixture of N-sec-butylcyclohexylamine and the above-named d-D- and l-D water-insoluble salts and which permits fractional crystallization of the d-D salt from the l-D salt is operative in my process. Examples of such solvents include: lower alcohols, such as methanol and ethanol; low molecular weight ketones, such as acetone and methylethylketone; and amides, such as dimethylformamide and diethylformamide. I prefer to use dimethylformamide.

I then separate the water-insoluble tartaric salts by any suitable means. In separating the water-insoluble d-D and l-D salts, I prefer to first crystallize from the solution the d-D salt. I then separate the crystalline d-D salt from the solution by any suitable means. The l-D salt is later crystallized from the solution by any suitable means. I prefer, however, to crystallize the l-D salt by diluting the solution with an equivalent volume of hot water, allowing the resulting diluted solution to cool to room temperature and then cooling the solution for about 100 hours at a temperature of about 0–5° C. to permit complete crystallization of the l-D salt.

I can then separately convert the respective d-D and l-D salts to water-soluble salts of N-d- and N-l-sec-butylcyclohexylamine by any suitable means. In forming the water-soluble salts of the amines, I employ an acid which changes the dibenzoyl-D-tartrate anion of either the d-D salt or the l-D salt into methyl hydrogen dibenzoyl-D-tartrate and which thereby causes formation of the respective soluble salts of N-d and N-l-sec-butylcyclohexylamine. Examples of acids which cause this change of the tartrate anion to methyl hydrogen dibenzoyl-D-tartrate and give rise to water-soluble salts therewith include hydrochloric acid, sulfuric acid, phosphoric acid, acetic acid, nitric acid, and the like. The respective d-D and l-D salts are then separately converted to water-soluble salts of N-d- and N-l-sec-butylcyclohexylamine by any suitable means such as adding sufficient amounts of acid to separate water suspensions of the d-D or l-D salts to convert the said salts into the corresponding water-soluble salts of N-d- and N-l-sec-butylcyclohexylamine and to precipitate the water-insoluble methyl hydrogen dibenzoyl-D-tartrate. However, I prefer to convert the d-D and l-D water-insoluble salts to the corresponding water-soluble amine salts by forming suspensions of the d-D and l-D salts in separate mixtures of water and a water-insoluble solvent in which methyl hydrogen dibenzoyl-D-tartrate is soluble, but in which the water-soluble salts of the respective amines are insoluble. Examples of solvents operative in my process include butyl acetate, ethyl acetate, ethyl ether, and the like. I prefer butyl acetate. I then add amounts of acid to the said suspensions to form the respective corresponding water-soluble amine salts from the water-insoluble d-D or l-D salts therein. The resulting suspensions are then permitted to separate into water layers containing the water-soluble amine salts and oil layers containing in solution the methyl hydrogen benzoyl-D-tartrate.

In converting the water-soluble amine salts to the corresponding free amines, I adjust the alkalinity of the water layers to a pH between 7.5 and 12.5 with an inorganic base. Examples of bases which are operative in my process include sodium hydroxide, ammonium hydroxide, potassium hydroxide and the like. I can then recover the liquid amines by any suitable means. In my process, however, I prefer to convert the liquid-free amines to the corresponding hydrochlorides to obtain a solid form. I can convert the liquid amines to the corresponding hydrochlorides by any suitable means. However, I prefer to dissolve the free amines in ether and saturate the resulting solutions with dry hydrogen chloride to obtain the crystalline amine hydrochlorides.

The following examples are offered to illustrate the resolution of N-d- and N-l-sec-butylcyclohexylamine from the racemic dl-mixture of N-sec-butylcyclohexylamine. However, I do not intend to be limited to the specific materials, proportions, or procedures employed. Various equivalents of my process will obviously occur to those skilled in the art and I intend to include such equivalent swithin the scope of my invention.

*Example 1*

To a solution of 149 g. of methyl hydrogen dibenzoyl-D-tartrate in 400 ml. of dimethylformamide was added 62 g. of racemic N-sec-butylcyclohexylamine. The resulting mixture was allowed to crystallize at 0–5° C. for 96 hours. The resolved crystals of N-d-sec-butylcyclohexylammonium methyl dibenzoyl-D-tartrate were separated from the solution by filtration. The filtered solution was then treated as described in Example II. Then, 5.3 g. of the N-*d*-sec-butylcyclohexylammonium methyl dibenzoyl-D-tartrate crystals were added to a mixture of 25 mls. of butyl acetate and 25 mls. of water, and to the resulting mixture was then added 1 ml. of concentrated hydrochloric acid. The resulting mixture was stirred until all the crystals had dissolved. The mixture was then permitted to separate into a butyl acetate layer and a water layer, the latter containing N-*d*-sec-butylcyclohexylamine hydrochloride. The layers were then separated and the water layer was made alkaline by adding 5 mls. of a 10% by weight sodium hydroxide solution, based on the weight of the solution, to liberate the free N-*d*-sec-butylcyclohexylamine. The N-*d*-sec-butylcyclohexylamine was then extracted with 50 mls. of ethyl ether and the ethereal extract was saturated with dry hydrogen chloride to precipitate crystalline N-*d*-sec-butylcyclohexylamine hydrochloride. The precipitated hydrochloride, after separation from the ether solution, was dissolved in dimethylformamide and recrystallized therefrom. M.P.R. 244–245°. [α] 25 Hg+5.2°.

*Example II*

The filtered dimethylformamide solution of Example I containing N-*l*-sec-butylcyclohexylammonium methyl dibenzoyl-D-tartrate was diluted with an equal volume of hot water and the resulting solution allowed to cool to room temperature. Then the solution was cooled at 0–5° C. for 96 hours to precipitate crystalline N-*l*-sec-butylcyclohexylammonium methyl dibenzoyl-D-tartrate. Then, 5.3 g. of the crystalline tartrate was added to a mixture of 25 mls. of butyl acetate and 25 mls. of water. To the resulting mixture was added 1 ml. of concentrated hydrochloric acid and the resulting mixture was stirred until all the crystals were dissolved. The mixture was then permitted to separate into a butyl acetate layer and a water layer. The layers were separated and the water layer was made alkaline by adding 5 mls. of a 10% by weight sodium hydroxide solution, based on the weight of the solution, to liberate N-*l*-sec-butylcyclohexylamine. The N-*l*-sec-butylcyclohexylamine was then extracted with 50 mls. of ethyl ether and the ethereal extract was saturated with dry hydrogen chloride to precipitate crystalline N-*l*-sec-butylcyclohexylamine hydrochloride. The precipitated hydrochloride was separated from the ether solution, dissolved in dimethylformamide and recrystallized therefrom. M.P.R. 244–245°. [α] 25 Hg−5.0°.

Now having described my invention, what I claim is:
1. A process for the resolution of N-*dl*-sec-butylcyclohexylamine racemic mixtures which comprises reacting methyl hydrogen dibenzoyl-D-tartrate with N-*dl*-sec-butylcyclohexylamine in dimethylformamide as a solvent to form the solvent-insoluble salt N-*d*-sec-butylcyclohexylammonium methyl dibenzoyl-D-tartrate and the solvent-soluble N-*l*-sec-butylcyclohexylammonium methyl dibenzoyl-D-tartrate, allowing the said N-*d*-sec-butylcyclohexylammonium methyl dibenzoyl-D-tartrate salt to crystallize from the solvent containing soluble N-*l*-sec-butylcyclohexylammonium methyl dibenzoyl-D-tartrate, adding an acid to the said insoluble N-*d*-sec-butylcyclohexylammonium methyl dibenzoyl-D-tartrate salt to form a water-soluble acid salt of N-*d*-sec-butylcyclohexylamine, forming an aqueous solution of said water-soluble N-*d*-sec-butylcyclohexylamine acid salt, adjusting the pH of said solution to between about 7.5–12.5 with an inorganic base to recover N-*d*-sec-butylhexylamine.

2. The process of claim 1 wherein the acid is hydrochloric acid.

3. The process of claim 1 wherein the base is sodium hydroxide.

4. A process for the resolution of N-*dl*-sec-butylcyclohexylamine racemic mixtures with comprises reacting methyl, hydrogen, dibenzoyl-D-tartrate with N-*dl*-sec-butylcyclohexylamine in dimethylformamide as a solvent to form the solvent insoluble salt N-*d*-sec-butylcyclohexylammonium methyl dibenzoyl-D-tartrate and the solvent soluble N-*l*-sec-butylcyclohexylammonium methyl dibenzoyl-D-tartrate, allowing the said N-*d*-sec-butylcyclohexylammonium methyl dibenzoyl-D-tartrate salt to crystallize from the solvent containing soluble N-*l*-sec-butylcyclohexylammonium methyl dibenzoyl-D-tartrate, adding water to the solvent containing N-*l*-sec-butylcyclohexylammonium methyl dibenzoyl-D-tartrate to crystallize the said N-*l*-sec-butylcyclohexylammonium methyl dibenzoyl-D-tartrate, adding an acid to the said crystalline N-*l*-sec-butylcyclohexylammonium methyl dibenzoyl-D-tartrate to form a water-soluble acid salt of N-*l*-sec-butylcyclohexylamine, forming an aqueous solution of said water-soluble N-*l*-sec-butylcyclohexylamine acid salt, adjusting the pH of said solution to between 7.5–12.5 with an inorganic base to recover N-*l*-sec-butylcyclohexylamine.

5. The process of claim 4 wherein the acid is hydrochloric acid.

6. The process of claim 4 wherein the base is sodium hydroxide.

References Cited in the file of this patent
FOREIGN PATENTS
573,514    Great Britain _____ Nov. 23, 1945

OTHER REFERENCES

Corrodi et al.: Helv. Chim. Acta, vol. 39, pages 889–897 (1956).

Takamatsu: CA, vol. 51, page 4303 (1957), abstract of J. Pharm. Soc., Japan, vol. 76, pages 1219–1222 (1956).

Noller: Chemistry of Organic Compounds (1951), pages 332–333.

Gilman: Organic Chemistry, vol. I, 2nd ed. (1953), page 260.

D'Amico et al.: Chemical Abstracts, vol. 50 (1956), pages 13800–13801.

(Copies of above in Library.)